(12) United States Patent
Stiltner

(10) Patent No.: US 7,862,093 B2
(45) Date of Patent: Jan. 4, 2011

(54) WIRE SPOOL CADDY

(76) Inventor: Rodney Stiltner, 4054 Georgia Highway 352, Box Springs, GA (US) 31801

( * ) Notice: Subject to any disclaimer, the term of this patent is extended or adjusted under 35 U.S.C. 154(b) by 0 days.

(21) Appl. No.: 12/212,148

(22) Filed: Sep. 17, 2008

(65) Prior Publication Data

US 2010/0066107 A1 Mar. 18, 2010

(51) Int. Cl.
*B65G 7/12* (2006.01)
(52) U.S. Cl. .......................................................... 294/15
(58) Field of Classification Search .................. 294/15, 294/67.1, 67.2, 67.22; 242/129
See application file for complete search history.

(56) References Cited

U.S. PATENT DOCUMENTS

| | | | |
|---|---|---|---|
| 3,134,555 A | 5/1964 | Baker | |
| 3,279,753 A | 10/1966 | Ventriglio et al. | |
| 3,854,509 A | 12/1974 | Bailey | |
| 4,202,509 A | 5/1980 | Horn | |
| 4,358,143 A * | 11/1982 | Cullen | 294/93 |
| 4,557,515 A * | 12/1985 | Read | 294/67.22 |
| 4,564,152 A | 1/1986 | Herriage | |
| 4,579,358 A | 4/1986 | Byfield, Jr. | |
| D328,378 S | 7/1992 | Hargrove | |
| D345,095 S | 3/1994 | Hanway | |
| 5,308,012 A | 5/1994 | Fuller | |
| 5,421,501 A | 6/1995 | Haines | |
| 5,595,355 A | 1/1997 | Haines | |
| 5,667,163 A | 9/1997 | Sordahl | |
| 5,944,280 A | 8/1999 | Dimitri | |
| 6,109,561 A | 8/2000 | Haines | |
| 6,698,682 B1 | 3/2004 | Roderick | |
| D542,124 S | 5/2007 | Sellers | |

* cited by examiner

*Primary Examiner*—Paul T Chin
(74) *Attorney, Agent, or Firm*—C. Travis Tunnell

(57) ABSTRACT

A novel wire spool caddy for transporting spools of electrical wire is comprised of a handle perpendicularly connected to the upper end of a shaft member. The shaft member is angularly connected to an extension member. The lower end of the extension member is angularly connected to the upper end of a second shaft member. An axis member is perpendicularly connected to the second shaft member. The axis member has an interior and exterior retaining cap for the purpose of retaining a coaxial rotational member which supports a wire spool when it is placed on the wire spool caddy. During use, the wire spool caddy allows the operator to guide and transport a wire spool by pushing it along.

3 Claims, 1 Drawing Sheet

WIRE SPOOL CADDY

BACKGROUND OF THE INVENTION

1. Field of the Invention

This invention generally relates to the field of wire carrying spools of the kind whereon wire, such as copper electrical wire, is wound in layers upon the spool for storing, transporting, and dispensing, and in particular to the field of apparatus which may be used to manually transports the spool from the storage location to a position for use.

2. Description of the Prior Art

It is common practice in the construction and electrician industry to use large spools of copper wire that have been wound about the outer diameter of a spool barrel in successive layers to provide for storage, transport, and dispensing at the use station of the wire. Typically, the wire is wound on a spool at a wire-manufacturing station or site, the spool is then placed in a transporting vehicle, and is removed from the vehicle at a storage location or use site. It is necessary then to move the spool from the vehicle or storage location and transport it to the actual place of work.

In the past, handles have been provided on one end of the spools for manually carrying and positioning the spools. However, when the spools are of a weight exceeding one hundred pounds, manual transport becomes difficult and cumbersome. Generally, workers on site will use a variety of manual methods to transport the spool. If the worker is strong enough, the spool can be carried on the users shoulder. Alternatively, users will try to kick the spool short distances or lean over and push the spool the entire distance to the work site. All of these methods exhaust substantial amounts of energy that the user would prefer to devote to other tasks. In many instances, the use of these manual methods have caused injuries, such as lower back strain, and stubbed toes.

3. Objects and Advantages

Accordingly, one object of the present invention is to provide a wire spool caddy that has a solid, sturdy construction that has sufficient strength to withstand the forces imparted on it. Although the caddy could be made from a variety of materials, such as various plastics, metals, or composites, the preferred embodiment of this invention is built from welded steel. Steel provides sufficient strength and durability for the caddy, which must be able to withstand the load, strain, and torque forces that are generated from transporting wire spools that often weigh in excess of 100 pounds.

It is another object of the present invention to provide a wire caddy that has a simple but reliably effective means for retaining the spools on the during the transport process. This present invention has a small cap on the end of the axis of the caddy on which spool rotates. This cap, which is larger in diameter that the axis of the caddy, prevents the spool from sliding of the caddy when force is applied. This cap can be welded to the caddy or in another embodiment, it can screw on the end of the caddy's axis.

It is a further object of the present invention to provide a chair that is easy to manufacture and is relatively inexpensive. In the preferred embodiment, the wire spool caddy can be constructed from off the shelf steel pipe, which can be easily cut and then welded into the appropriate configuration. The lack of any custom parts and inexpensive nature of the materials used in constructing the present invention ensures that the wire caddy can be constructed economically.

It is a further object of the present invention to provide a chair that can simply and easily aid in the transport of a wire spool from one location to another. By inserting the caddy into the hollow axis of the spool, the user is able to take advantage of circular body of the spool, to create a wheel and axis. The user can than apply a relatively small amount of force to the handle and then roll the spool to its destination. The large handle of the caddy allows the user to apply torque along the length of the caddy's body to the spool, giving the user a means to steer the wire spool as it is pushed to its destination.

It is a further object of the present invention to provide a chair that requires no assembly on site.

These and other objects and advantages of the present invention will become apparent from a reading of the attached specification and appended claims.

SUMMARY OF THE INVENTION

In accordance with the present invention, as applied to a wire spool caddy, a handle is provided for allowing the user to direct force to the wire spool. Additionally, the handle allows the user to steer the wire spool as it is pushed. A shaft member is perpendicularly connected to the handle on one end and angularly connected to a second shaft member on the other end. The second shaft member is perpendicularly connected to an axis member. A support member is angularly connected between the second shaft member the axis member to reinforce the joint. An interior retaining cap is connected to the edge of the support member. Surrounding the axis member is a rotational member that allows the spool to freely spin on the axis member. The axis member has an exterior retaining cap connected to its free end for holding the rotational member thereon. Furthermore, the retaining cap secures a wire spool to the wire spool caddy while in use.

DETAILED DESCRIPTION OF THE PREFERRED EMBODIMENT

Figure 1:
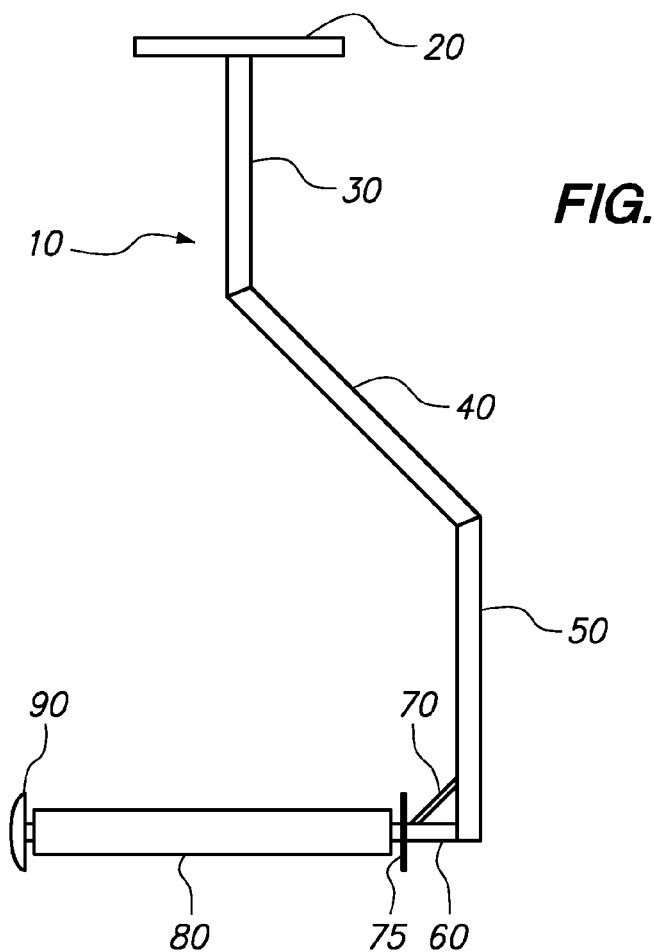
FIG. 1 is a front view in illustrating the wire spool caddy.

Referring now to the drawings, the novel wire spool caddy invention can be better understood by reference to FIG. 1. Illustrated in FIG. 1 a wire spool caddy is indicated generally at 10. The caddy has a handle 20; a shaft member 30; an extension member 40; a second shaft member 50; an axis member 60; a support member 70; a coaxial rotational member 80; an interior retaining cap 85; and an exterior retaining cap member 90.

Caddy 10 can be composed out of a variety of rigid materials, such as plastic, wood, metal, or composites, however, in the preferred embodiment Caddy 10 is constructed from steel. Furthermore, in the preferred embodiment, the method for connecting the various members is by welding.

The center of Handle 20 is connected perpendicularly to the upper end of shaft member 30. The lower end of shaft member 30 is angularly connected at approximately forty-five degrees to extension member 40. The lower end of extension member 40 is angularly connected at approximately forty-five degrees to the upper end of a second shaft member 50. Axis member 60 is perpendicularly connected to said second shaft member 50, such that axis member 60 is parallel to said handle 20. Support member 70 creates a right triangle by interconnecting said second shaft member 50 and said axis member 60.

A hollow circular interior retaining cap 85 is slid down said axis member 60 and connected to said support member 70 to provide a barrier between a coaxial rotational member 80 and said support member 70. The interior of said coaxial rotational member 80 is lubricated and then placed such that it coaxially surrounds said axis member 60 allowing said rotational member 80 to coaxially rotate around said axis member 60. Exterior retaining cap 90 is connected to the exterior end of said axis member 60 to retain said coaxial rotational member 80.

Figure 2:
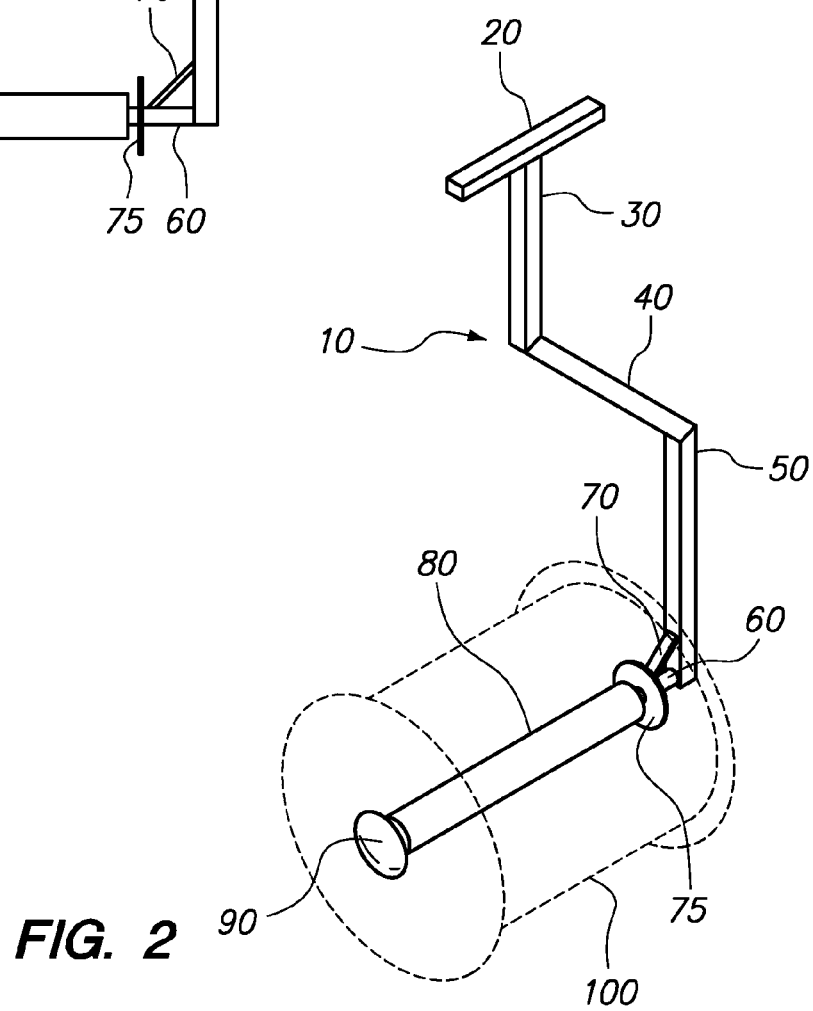
FIG. 2 is an elevated view in perspective illustrating the wire spool caddy with a wire spool resting on the rotational member as it would during normal operation.

Further, as shown in FIG. 2, when wire spool 100 is placed on wire caddy 10, said exterior retaining cap 90 retains said wire spool 100 in place during operation.

Having described my invention, I claim:

1. A wire spool caddy, comprising:
    a handle;
    a shaft member; said shaft member is perpendicularly connected to the center of said handle;
    an extension member, said extension member is angularly connected to said shaft member;
    a second shaft member, said second shaft member is angularly connected to said extension member;
    an axis member, said axis member is perpendicularly connected to said second shaft member, such that said axis member is parallel to said handle;
    a support member, said support member is angularly connected between said second shaft members and said axis member such that a right triangle is formed;
    a coaxial rotational member, said coaxial rotational member is located coaxially on the exteriors of said axis member;
    whereby, the axis member can be inserted through the central axis of a wire spool, such that a spool of wire can rest or freely rotate on said coaxial rotational member and said handle member can be used to direct force through said first shaft, said extension member, and said second shaft to allow a user to guide and transport a spool to its destination.

2. The wire spool caddy of claim 1, further including an interior retaining cap is connected to the edge of said support member.

3. The wire spool caddy of claim 2, further including an exterior retaining cap is connected to the outer end of said axis member.

\* \* \* \* \*